(No Model.)
D. J. ROUSH.
POTATO DIGGER.
No. 511,550. Patented Dec. 26, 1893.
Fig. 1.
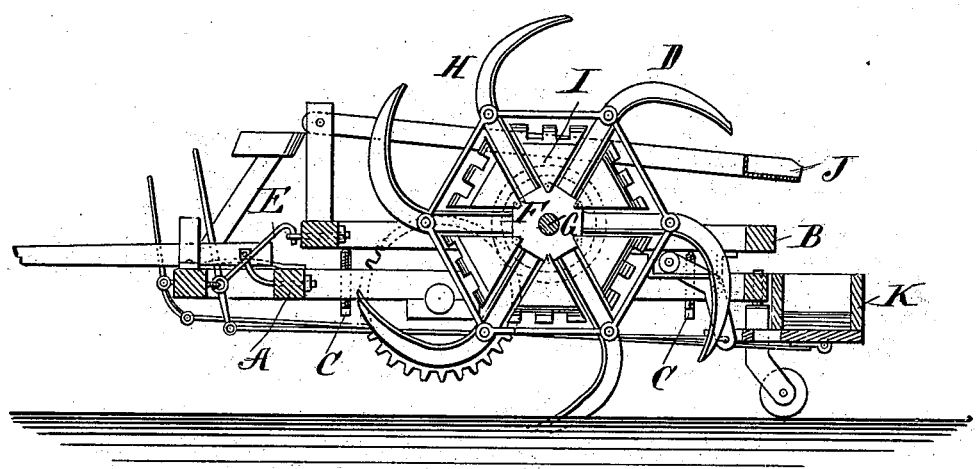
Fig. 2. Fig. 3.
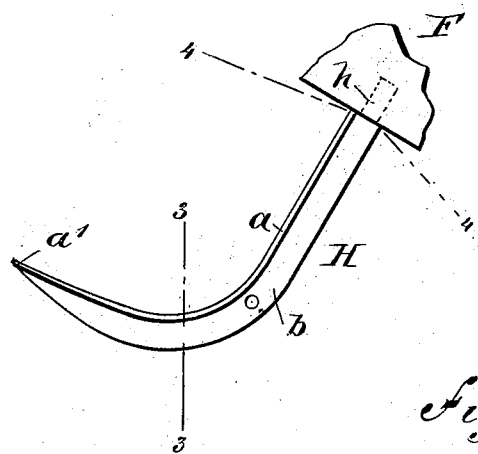 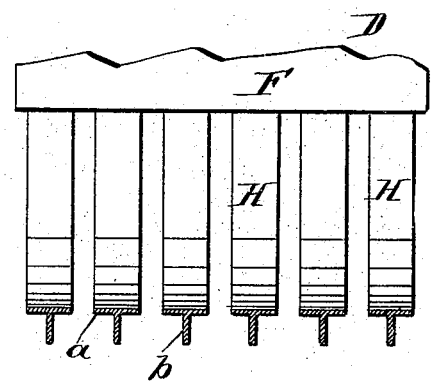
Fig. 4.
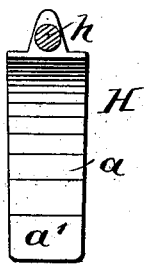
WITNESSES:
Chas Nida
C. Sedgwick
INVENTOR
D. J. Roush
BY Munn & Co
ATTORNEYS.

UNITED STATES PATENT OFFICE.

DAVID J. ROUSH, OF GROVETON, PENNSYLVANIA.

POTATO-DIGGER.

SPECIFICATION forming part of Letters Patent No. 511,550, dated December 26, 1893.

Application filed November 1, 1892. Serial No. 450,666. (No model.)

*To all whom it may concern:*

Be it known that I, DAVID J. ROUSH, of Groveton, in the county of Allegheny and State of Pennsylvania, have invented a new and Improved Potato-Digger, of which the following is a full, clear, and exact description.

The invention relates to that form of potato diggers in which rotary digging fingers, arranged in series and actuated from the drive wheels, dig the potatoes and elevate the same, depositing them on a screen or in a suitable receptacle; and the object of the invention is to so improve the fingers of such machines, that the digging and elevation of the potatoes will be more perfectly effected and with less liability of injury to the potatoes.

Reference is to be had to the accompanying drawings, forming a part of this specification, in which similar letters of reference indicate corresponding parts in all the figures.

Figure 1 is a longitudinal, sectional elevation of a potato digging machine provided with the improved fingers. Fig. 2 is an enlarged side elevation of one of the improved fingers. Fig. 3 is a cross section through the several sets of fingers as indicated by line 3—3 of Fig. 2; and Fig. 4 is a cross section through one of the fingers, at the base thereof, as indicated by line 4—4 Fig. 2.

The apparatus shown in Fig. 1, is, with the exception of the fingers, the same as that patented to me on November 2, 1875. The same consists of a main frame A, mounted on wheels, in practice, and an auxiliary frame B, supported adjustably from frame A, by adjusting screws C, and serving to support the digger drum D, the draft strain on frame B being sustained by the links E. The digger drum comprises a hub F on a shaft G, and the fingers H, arranged in the form of a series of wheels and curved at their outer ends, as shown. The rotary fingers deliver the potatoes to an openwork frame or screen I, from which they fall to a screen J, finally gravitating to the box K, and the box is provided with a slide in its bottom which is operated by suitable devices from the driver's seat.

Thus far the digger forms no part of the present invention.

In order to make the above described machine and similar ones, more effective, I have devised the improved fingers H, best shown in Figs. 2 to 4, the same being T-shaped in cross section. The face $a$ or front of the fingers consists of a broad plate, having a broad point $a'$, as shown, and the back $b$, which forms the stem of the T and projects from the plate $a$ at right angles, and gradually tapers at the point of the finger as shown best in Fig. 2. By this construction of finger, the digging and elevation of the potatoes without injury is insured, and the fingers are given increased strength. At the base of the fingers the same are formed with a shank $h$ which is threaded and held to the hub by a nut, (not shown.)

Having thus fully described my invention, I claim as new and desire to secure by Letters Patent—

The herein described single finger H angular in side elevation curved as shown, T-shape in cross section with its flat face $a$ in the front and formed at its inner end with the attaching shank $h$ and with a broad outer end $a'$, substantially as set forth.

DAVID J. ROUSH.

Witnesses:
JOHN S. KENNEDY,
AUGUSTUS VICK.